(12) United States Patent
Campbell et al.

(10) Patent No.: US 6,742,612 B2
(45) Date of Patent: Jun. 1, 2004

(54) OFFROAD TRACKED VEHICLE FOR SNOW AND ICE

(76) Inventors: Jeffery D. Campbell, 2686 N. Argyle St., Fresno, CA (US) 93927; James Albert Bratton, 2763 N. Argyle, Fresno, CA (US) 93727

( * ) Notice: Subject to any disclaimer, the term of this patent is extended or adjusted under 35 U.S.C. 154(b) by 19 days.

(21) Appl. No.: 10/140,553

(22) Filed: May 7, 2002

(65) Prior Publication Data

US 2003/0209372 A1 Nov. 13, 2003

(51) Int. Cl.[7] .............................................. B62D 11/04
(52) U.S. Cl. ..................................... 180/6.48; 180/53.4
(58) Field of Search .............................. 180/9.44, 9.21, 180/9.26, 9.28, 9.3, 9.32, 190, 192, 9.1, 6.3, 6.48, 53.4

(56) References Cited

U.S. PATENT DOCUMENTS

| | | | | |
|---|---|---|---|---|
| 3,666,034 A | * | 5/1972 | Stuller et al. | 180/6.48 |
| 4,069,883 A | * | 1/1978 | Cousineau | 180/185 |
| 4,519,465 A | * | 5/1985 | Triplett | 180/6.48 |
| 4,527,649 A | * | 7/1985 | Mauldin | 180/6.48 |
| 5,137,100 A | * | 8/1992 | Scott et al. | 180/6.48 |
| 5,373,909 A | * | 12/1994 | Dow et al. | 180/9.1 |
| 5,860,484 A | * | 1/1999 | Kauss | 180/6.48 |
| 6,076,619 A | * | 6/2000 | Hammer | 180/6.48 |
| 6,409,273 B1 | * | 6/2002 | Campbell | 298/2 |
| 6,550,505 B2 | * | 4/2003 | Nault et al. | 144/336 |

* cited by examiner

Primary Examiner—Lesley D. Morris
Assistant Examiner—Tony Winner
(74) Attorney, Agent, or Firm—Jeffrey A. Hall

(57) ABSTRACT

A tracked vehicle for use in snow, ice, dirt, sand, mud, and other offroad conditions, with an accessory attachment valve, comprises, a frame, a body, a first track for driving and control of the tracked vehicle being secured to the frame, and a second drive track for driving and control of the tracked vehicle. A drive engine is mounted on the frame and communicatively linked to the first and second drive track by a drive mechanism. A hydraulic pump is linked to a hydraulic drive motor, the hydraulic pump being operably linked to the second drive track. A throttle mechanism is operably engaged to the drive engine with a hydraulic attachment lever valve secured to the frame. A secondary hydraulic pump is operably linked to the hydraulic attachment lever valve. An accessory hydraulic attachment valve for attaching various mechanical devices, preferably with hydraulic hoses, is secured to the frame and to a secondary hydraulic pump, and may accommodate operable linkage to various devices such as skis, augers, chippers, stretchers, wheel attachment devices, snow blowers, ice scrapers and other devices.

5 Claims, 3 Drawing Sheets

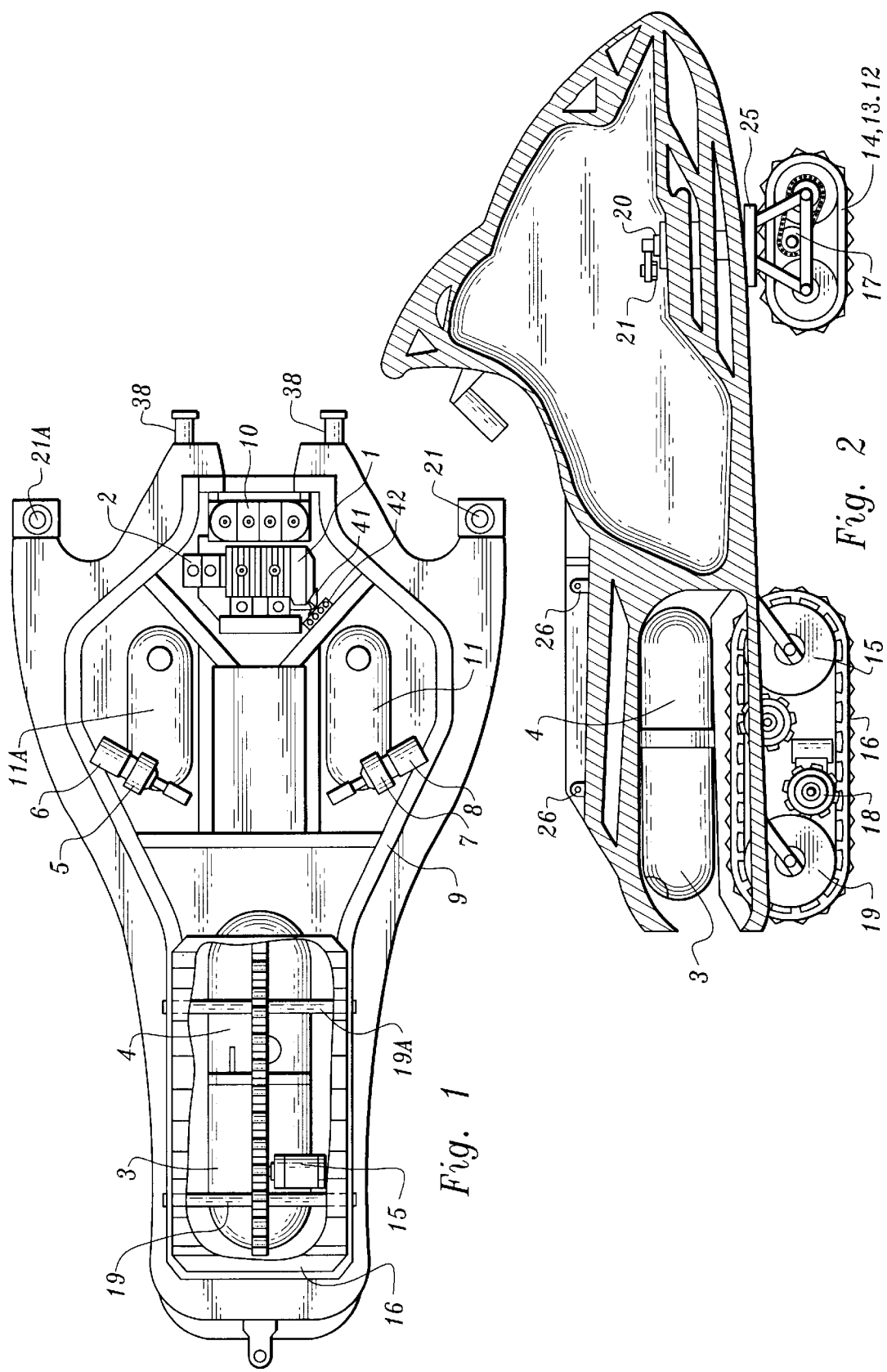

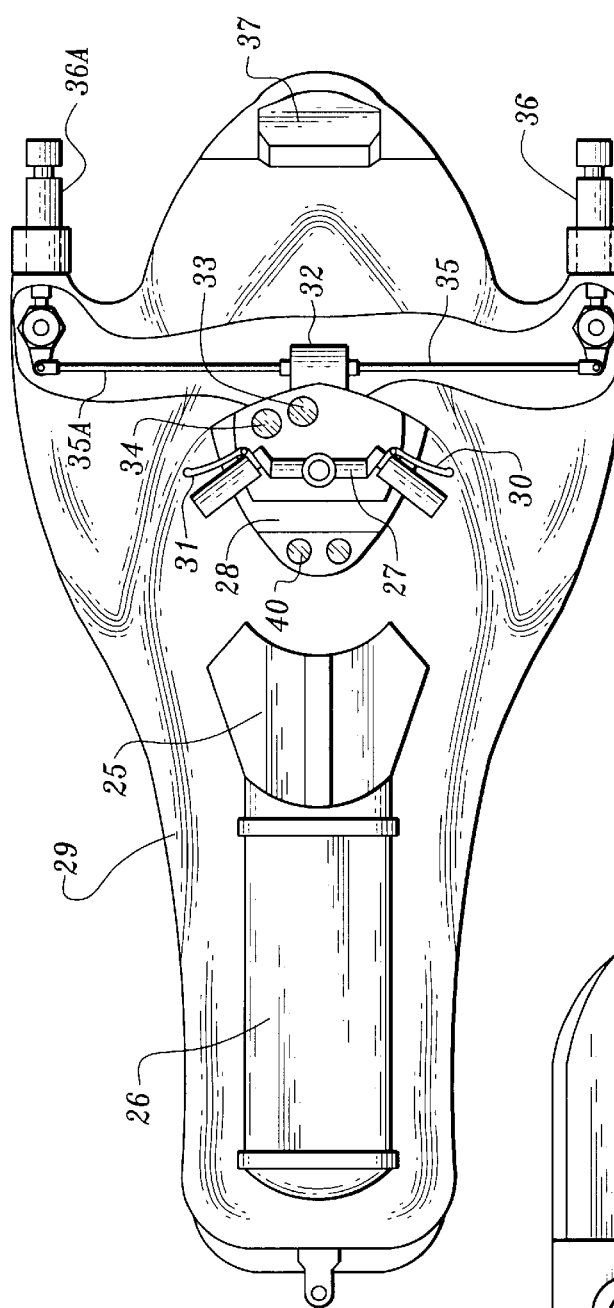
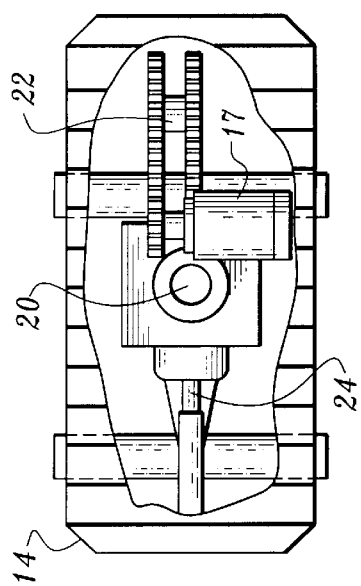
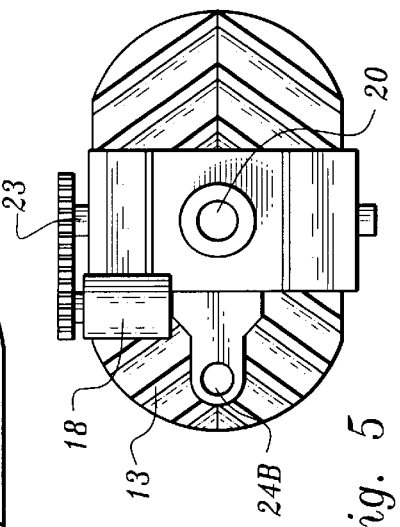
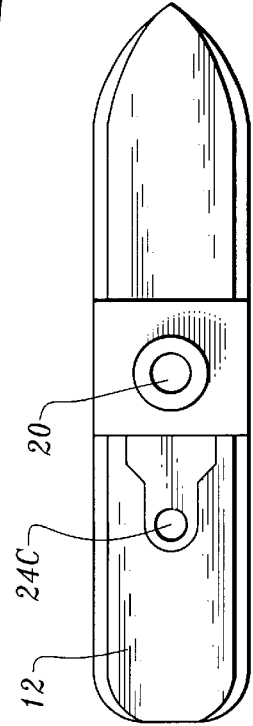
Fig. 3
Fig. 4
Fig. 5
Fig. 6

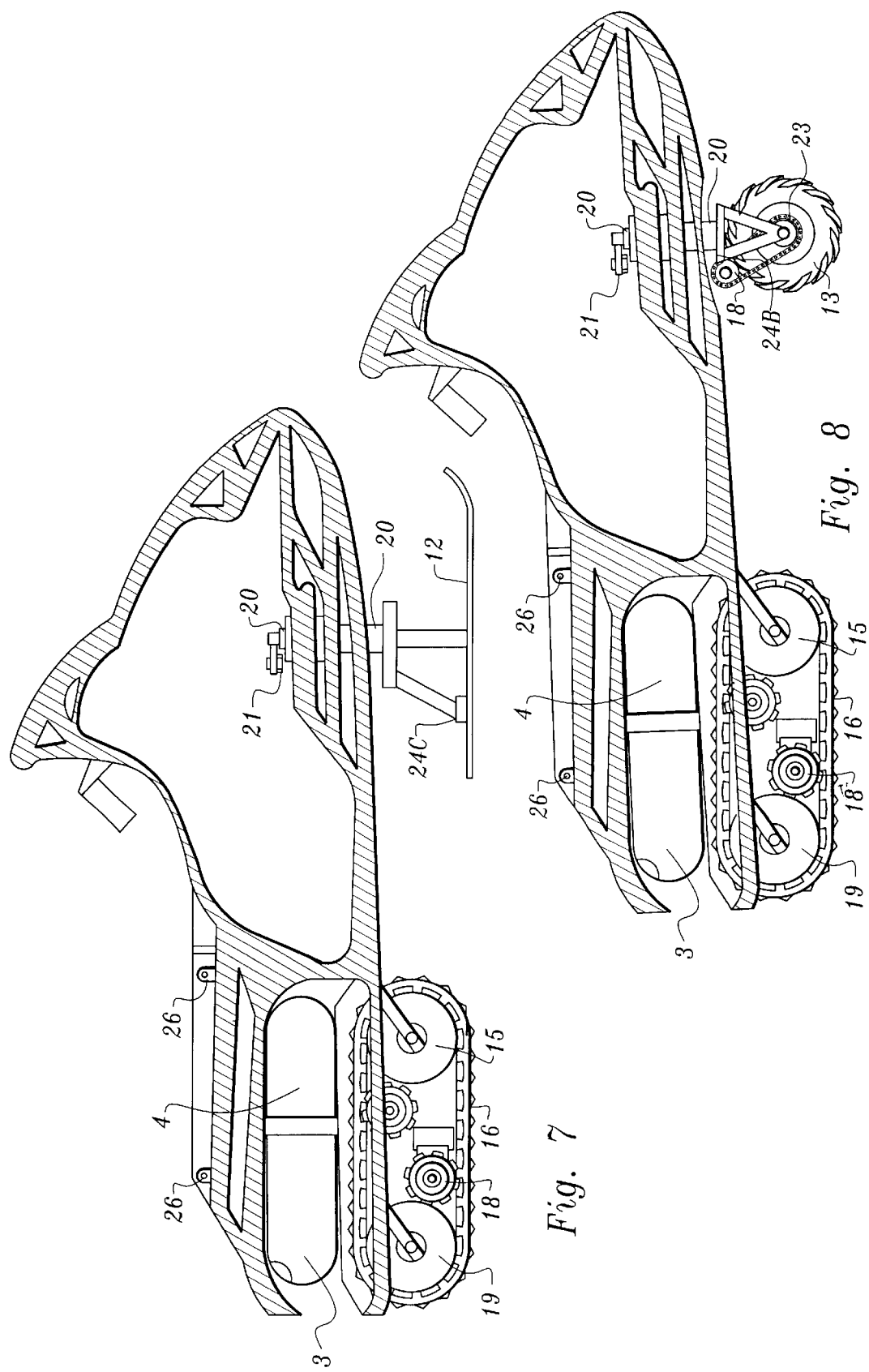

OFFROAD TRACKED VEHICLE FOR SNOW AND ICE

BACKGROUND OF THE INVENTION

1. Technical Field

This invention relates to snowmobiles and other transporting and carrying devices for use in offroad conditions such as snow, ice, dirt, sand, and mud, and more particularly to tracked vehicles for use in snow, ice, dirt, sand, and mud, and other offroad conditions which are equipped with an engine and drive means for propelling the vehicle.

2. Background Art

The usefulness of carrying apparatuses and vehicles such as snowmobiles, tractors, carts, and other carriers are well known to those involved in outdoor sports, construction, farming, gardening, and other uses where objects, loads, people, or the like are moved and transported from one place to another.

Heretofore, attempts have been made to power or motorize various vehicles such as snowmobiles, carts, tractors, golf carts, wheelbarrows, and the like by using gasoline powered engines in order to propel the device. However, none of these devices show a feasible and economical vehicle for snow, ice, dirts, mud and other offroad conditions, which may accommodate various attachments, such as skis, snowblowers, augers, chippers, shredders, mixers, stretchers, ice scrapers, augers, plows, or the like, which may be secured to and powered by the vehicle.

Accordingly, it is the primary object of this invention to provide a tracked vehicle for offroad use which operates safely, efficiently, and which is lightweight, strong, balanced, and efficient at carrying and transporting a wide range of load sizes and weights. The tracked vehicle of the present invention includes an accessory attachment valve for attaching various mechanical devices, preferably with hydraulic hoses, to the tracked vehicle. The tracked vehicle of the present invention has high performance capability and possesses sufficient power to drive the vehicle at both slow speeds and high speeds with small, medium or large loads in snow, ice, dirt, sand, mud and other offroad conditions conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims

BRIEF SUMMARY OF THE INVENTION

To achieve the foregoing objects, and in accordance with the purpose of the invention as embodied and broadly described herein, a tracked vehicle for use in snow and ice which preferably includes an accessory attachment valve, comprises, a frame, a first track for driving and control of the tracked vehicle being secured to the frame, and a second drive track for driving and control of the tracked vehicle. A drive engine is mounted on the frame and communicatively linked to the first and second drive track by a drive mechanism. A hydraulic pump is linked to a hydraulic drive motor, the hydraulic pump being operably linked to the second drive track. A throttle mechanism is operably engaged to the drive engine with a hydraulic attachment lever valve secured to the frame. A secondary hydraulic pump is operably linked to the hydraulic attachment lever valve. An accessory hydraulic attachment valve for attaching various mechanical devices, preferably with hydraulic hoses, is secured to the frame and to a secondary hydraulic pump, and may accommodate operable linkage to various devices such as skis, chippers, augers, shredders, plows, mixers, stretchers, wheel attachment devices, snow blowers, ice scrapers and other devices.

The tracked vehicle for snow, ice, dirt, sand, mud and other offroad conditions of the present invention is lightweight, balanced, efficient, and highly effective at allowing a user to operate a wide variety of devices therefrom simply by attaching the device to the hydraulic attachment lever valve.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a schematic view of a tracked vehicle for use offroad use, according to the invention.

FIG. 2 is a side view of such tracked vehicle according to the invention.

FIG. 3 is a top view of such tracked vehicle according to the invention.

FIG. 4, is a front schematic view of a rubber or steel drive track for such tracked vehicle, according to the invention.

FIG. 5, is a wheel accessory attachment, according to an embodiment of the invention.

FIG. 6, is a ski attachment accessory, according to the invention.

FIG. 7 shows ski attachment accessory of FIG. 6, attached to the tracked vehicle, according to an embodiment of the invention.

FIG. 8 shows the wheel accessory attachment of FIG. 5, attached to the tracked vehicle according to another embodiment of the invention.

DETAILED DESCRIPTION OF THE INVENTION

Reference will now be made in detail to the present preferred embodiments of the invention as illustrated in the accompanying drawings.

In accordance with the present invention, there is provided in a preferred embodiment of the invention, an offroad tracked vehicle for use in snow, ice, dirt, sand, mud, and other offroad conditions having an accessory attachment valve, comprising, a frame, a first track for driving and control of the tracked vehicle being secured to the frame, and a second drive track for driving and control of the tracked vehicle. A drive engine is mounted on the frame and communicatively linked to the first and second drive track by a drive mechanism. A hydraulic pump is linked to a hydraulic drive motor, the hydraulic pump being operably linked to the second drive track. A throttle mechanism is operably engaged to the drive engine with a hydraulic attachment lever valve secured to the frame. A secondary hydraulic pump is operably linked to the hydraulic attachment lever valve. An accessory hydraulic attachment valve for attaching various mechanical devices, preferably with hydraulic hoses, is secured to the frame and to a secondary hydraulic pump, and may accommodate operable linkage to various devices such as skis, snowblowers, augers, chippers, shredders, mixers, stretchers, plows, wheel attachment devices, snow blowers, ice scrapers and other devices, which may be secured to and powered by the vehicle.

In FIG. 1, an offroad tracked carrier for snow, ice, dirt, sand, mud, and other offroad conditions is shown according to a preferred embodiment of the invention. Preferably, the user sits in seat 26, turns or otherwise activates ignition switch 39, which activates engine 1, which is preferably operably connected to electric start motor 41, which draws power from battery, 42, which may be a compact gel battery or other battery. Once engine 1, is operating engine 1, engages hydraulic fluid from primary hydraulic tank 3, from hydraulic double pump 2, which forces hydraulic fluid through drive hydraulic lever 5. Hydraulic lever 5, is preferably pressurized through hydraulic flo-divider 10, by the user steering handle bars 27, which steer the vehicle by steering tie rods 35 and 35A, and are best seen in FIG. 3.

Steering tie rods 35 and 35A, are preferably connected to tie rod connectors 24, 24B, and 24C, which are seen in FIG. 4. FIG. 5, and FIG. 6 respectively. Tie rod connectors 24, 24B, and 24C, are preferably connected to vehicle bearing sleeve 21 and 21A, best seen in FIG. 1.

A variable speed control mechanism 31, which determines hydraulic flow rate through drive lever valve 5, which then engages hydraulic fluid through quick connect fittings 6, to engage drive motors 15, 17, and 18, best seen in FIG. 2. Drive motors 15, 17 and 18, drive rear track 16, while simultaneously engaging drive motors 17 and 18, which are preferably attached to frame 9, by rear bearing sleeve connections 19. Front axle brackets and bearings 22 and 23, are preferably connected to bracket mounts 20, which are secured to bracket mounts 21 and 21A, for either forward or reverse motion depending on the position of drive lever valve 5.

When the offroad tracked vehicle for snow, ice, dirt, sand, mud, and other offroad conditions is in operation, fluid from flo-divider 10, travels to hydraulic cooling tank 4, for constant hydraulic fluid cooling from air induction vent 37, which is preferably connected to body 29, which is preferably composed of polyurethane or other durable resilient material. This allows air flow for engine 1, cooling, along with air flow to hydraulic fluid tanks 4, and 3, best seen in FIG. 1.

Hydraulic lever valve 7, preferably has constant hydraulic fluid traveling though it at all times through hydraulic flow sequence, once the user engages lever valve 7, in either forward or reverse motion. Hydraulic fluid is then dispersed to hydraulic attachments attached to front bracket mount 38, and rear bracket mount 26, through rear quick disconnect fittings 8, which operate a variety of hydraulic attachments, such as snowblowers, ice scrappers, augers, skis, plows, chippers, shredders, mixers, stretchers, side cars, winches, and the like.

In FIG. 3 engine temperature gauge 33, with sensors, keep constant heat temperature of the engine by thermal needle valve or optional digital reading displays. Fuel gauge 34, regulates fuel consumption through a needle valve and float device so as to keep the user informed of fuel level. Hydraulic fluid temperature gauge 40, preferably provided with a digital flow thermometer display, keeps the user informed at all time of hydraulic fluid temperature.

To stop operation, the user preferably puts drive lever valve 5, in the neutral position which then stops the vehicle automatically by stopping hydraulic flow through hydraulic double pump 2, which locks hydraulic drive motors 15, 17 and 18, to park position by fluid stop. The user may then turn the ignition key to off position and shut off the engine 1.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A tracked vehicle for use in snow and ice with an accessory attachment valve, comprising:

a frame having a hydraulic lever and a flow divider operably secured thereto;

one or more tie rods secured to said frame by tie rod connecting means for control of said tracked vehicle;

a variable speed control means for determining hydraulic flow rate through said hydraulic drive lever;

a first track for driving and control of said tracked vehicle being secured to said frame;

a second drive track for driving and control of said tracked vehicle being secured to said frame;

a drive engine operably mounted on said frame and communicatively linked to said first and second drive track by a hydraulic drive mechanism;

a hydraulic pump operably secured to said flow divider and linked to a hydraulic drive motor, said hydraulic pump being operably linked by said flow divider to said second drive track;

a throttle mechanism being operably engaged to said drive engine; and a hydraulic attachment lever valve secured to said frame.

2. The tracked vehicle with accessory attachment valve of claim 1, wherein said drive engine is a gasoline powered engine.

3. The tracked vehicle with accessory attachment valve of claim 1, further including a plurality of drive motors.

4. The tracked vehicle with accessory attachment valve of claim 1, further including bracket mount means for removal of said first track and replacement with wheel attachment.

5. The tracked vehicle with accessory attachment valve of claim 1, further including bracket mount means for removal of said first track and replacement with ski attachment.

* * * * *